UNITED STATES PATENT OFFICE.

ANDREW ENGLE, OF METZ, IOWA.

ARTIFICIAL FUEL AND PROCESS FOR MAKING.

No. 803,278. Specification of Letters Patent. Patented Oct. 31, 1905.

Application filed January 6, 1905. Serial No. 239,945.

*To all whom it may concern:*

Be it known that I, ANDREW ENGLE, a citizen of the United States, residing at Metz, in the county of Jasper and State of Iowa, have invented a new and useful Artificial Fuel and Process for Making, of which the following is a specification.

My object is, first, to dispose of night-soil in an economic manner; second, to utilize night-soil for generating heat; third, to destroy the offensive odor of night-soil; fourth, to combine night-soil with other matter to produce a solid artificial fuel; fifth, to prevent the dangers incident to placing night-soil in streams of water and polluting it with bacteria and disease germs.

My invention relates to the method of accomplishing the purposes contemplated; and it consists in the process of treating night-soil, manure, garbage, sewage, and other odorous offensive matter and combining it with combustible comminuted matter, as hereinafter set forth, to produce a new and valuable product for commercial purposes and adapted to be used advantageously for fuel in stoves and furnaces.

To deodorize night-soil or other offensive odorous material and waste products that contain carbon and are combustible, I add to a given quantity of such matter about one-tenth ($\frac{1}{10}$) the quantity of unslaked lime to heat the matter and absorb the moisture therein, and when the lime is sufficiently slaked to produce a hydrate and mixed with the mass of matter by manually using stirring devices or by the operation of machinery the composition will be ready for adding it as a component part of my artificial fuel.

To produce a solid artificial fuel by utilizing the matter composed of night-soil, &c., and lime, I take a given quantity thereof and add about double the quantity of comminuted solid combustible material thereto—such as coal, (a waste product called "slack,") waste tan-bark, peat, sawdust, and other dry waste or cheap products—and mix them thoroughly. To make the matter thus united more adhesive and to adapt it to be molded into briquets or blocks of various sizes and shapes, I add to about ten (10) barrels thereof about two (2) gallons of tar, oil, or like oleaginous matter to soften and temper the stuff and press it into molds. The liquid combustible matter thus added will also make the composition more inflammable and valuable as a fuel.

It is obvious the artificial fuel thus produced may be hardened in large masses and broken into pieces for use same as large pieces of coal taken from mines. It is also obvious that the artificial fuel thus produced will be hardened by drying and better adapted for handling, shipping, storing, and burning it.

Having thus set forth the purpose of my invention and the successive steps in the process of making the artficial fuel, the practical operation of the invention and the utility thereof will be readily understood by persons familiar with the art to which it pertains.

What I claim as new, and desire to secure by Letters Patent, is—

1. In a process for making artificial fuel, placing unslaked lime into night-soil and offensive combustible matter to absorb the moisture and destroy the odor and when the lime is slaked thoroughly mixing the hydrate produced by the lime with the matter deodorized by the lime, then adding about double the quantity of comminuted dry fuel to the product as set forth; then adding about two gallons of oleaginous inflammable matter, tar or the like, to about ten barrels of the product and thoroughly mixing it therewith to make it adhesible and plastic, for the purposes stated.

2. In a process for making artificial fuel, placing unslaked lime into night-soil and offensive combustible matter to absorb the moisture and destroy the odor and when the lime is slaked thoroughly mixing the hydrate produced by the lime with the matter deodorized by the lime; then adding about double the quantity of comminuted dry fuel to the product as set forth; then adding about two gallons of oleaginous inflammable matter, tar or the like, to about ten barrels of the product and thoroughly mixing it therewith to make it adhesible and plastic; then forming it into small pieces, for the purposes stated.

3. An artificial fuel composed of night-soil and the like, lime, comminuted coal and like dry combustible matter and tar or like oleaginous matter in about the quantity named.

ANDREW ENGLE.

Witnesses:
MELVIN STONE,
THOMAS G. ORWIG.